United States Patent [19]
Iwamura

[11] Patent Number: 6,064,435
[45] Date of Patent: May 16, 2000

[54] MOTION PICTURE SIGNAL COMPRESSING APPARATUS WHICH ENCODES THE MOTION VECTOR OF THE BLOCK OF A MOTION PICTURE SIGNAL PICTURE AS A MOTION VECTOR DIFFERENCE

[75] Inventor: Ryuichi Iwamura, Tokyo, Japan

[73] Assignee: Sony Corporation, Tokyo, Japan

[21] Appl. No.: 08/456,963

[22] Filed: Jun. 1, 1995

Related U.S. Application Data

[62] Division of application No. 08/286,562, Aug. 5, 1994, Pat. No. 5,510,841, which is a division of application No. 07/942,927, Sep. 10, 1992, abandoned.

[30] Foreign Application Priority Data

| Sep. 20, 1991 | [JP] | Japan | 3-270286 |
| Sep. 20, 1991 | [JP] | Japan | 3-270393 |
| Sep. 27, 1991 | [JP] | Japan | 3-277312 |

[51] Int. Cl.$^7$ ............................................. H04N 7/12
[52] U.S. Cl. ......................... 348/416; 348/420; 348/699
[58] Field of Search .................... 348/413, 416, 348/420, 421, 699; H04N 7/130, 7/137, 7/12

[56] References Cited

U.S. PATENT DOCUMENTS

| 4,689,673 | 8/1987 | Ohki et al. . |
| 4,777,530 | 10/1988 | Kondo . |
| 4,796,087 | 1/1989 | Guichard et al. . |
| 4,816,914 | 3/1989 | Ericsson . |
| 4,862,259 | 8/1989 | Gillard et al. . |
| 4,901,149 | 2/1990 | Fernando et al. . |
| 5,012,336 | 4/1991 | Gillard . |
| 5,019,901 | 5/1991 | Uomori et al. . |
| 5,021,879 | 6/1991 | Vogel . |
| 5,021,881 | 6/1991 | Avis et al. . |
| 5,113,255 | 5/1992 | Nagata et al. . |
| 5,128,756 | 7/1992 | Johnston et al. . |
| 5,142,360 | 8/1992 | Niihara . |
| 5,142,361 | 8/1992 | Tayama et al. . |
| 5,157,742 | 10/1992 | Niihara . |
| 5,162,907 | 11/1992 | Keating et al. . |
| 5,196,933 | 3/1993 | Henot . |
| 5,210,605 | 5/1993 | Zaccarin et al. . |

FOREIGN PATENT DOCUMENTS

| 0 248 711 | 5/1987 | European Pat. Off. . |
| 39 29 280 | 3/1991 | Germany . |
| 890017608 | 1/1989 | Japan . |

OTHER PUBLICATIONS

Electronic Letters, vol. 26, No. 5, Mar. 1, 1990, pp. 276–277, Hsieh et al. "Motion estimation algorithm using interblock correlation".

IEEE/IEICE Global Telecommunications Conference, Nov. 18, 1987, Tokyo, Japan, pp. 65–69, Puri et al. "Interframe coding with variable block–size motion compensation".

Proceedings of IEEE International Conference on Communications May 1984, Amsterdam pp. 516–520, Lin et al. "Motion Compensated Interframe Color Image Coding".

*Primary Examiner*—Richard Lee
*Attorney, Agent, or Firm*—Limbach & Limbach L.L.P.

[57] ABSTRACT

An apparatus is for compressing a motion picture signal. The apparatus includes a motion detection block; a difference determination block; an orthogonal transform block; a quantizing block; a local decoding block; a motion vector encoding block; and a motion compensating block. Significantly, the motion vector encoding block operates when respective differences between the motion vector for the target block and each motion vector for the comparison blocks is outside an allowable range. The motion vector encoding block generates an encoding of the motion vector for the target block which represents the motion vector for the target block as a difference between the motion vector for the target block and the motion vector for a selected one of the comparison blocks.

14 Claims, 19 Drawing Sheets

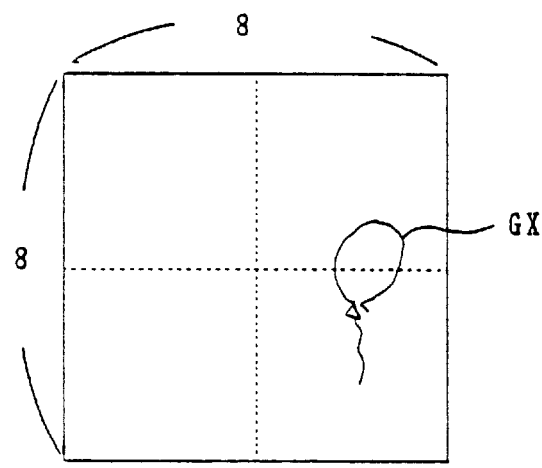
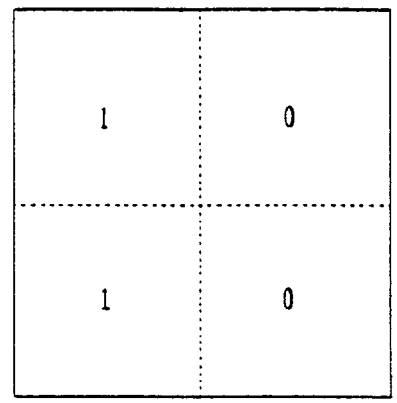
FIG. 2A        FIG. 2B
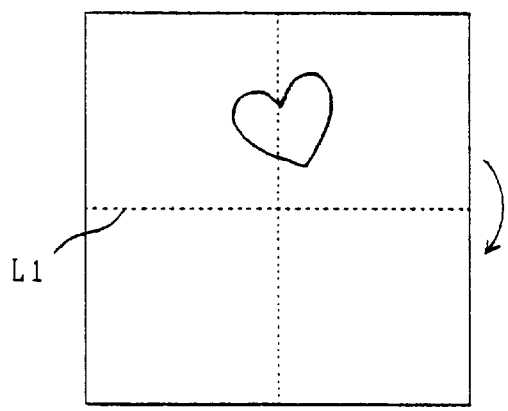
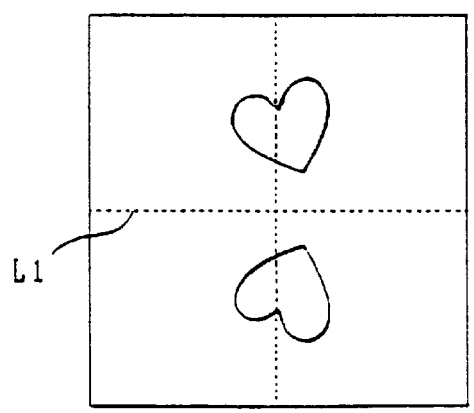
FIG. 3A        FIG. 3B $$\begin{bmatrix} X_{00} & - & - & - & - & - & - & X_{07} \\ 0 & 0 & 0 & 0 & 0 & 0 & 0 & 0 \\ X_{20} & - & - & - & - & - & - & X_{27} \\ 0 & 0 & 0 & 0 & 0 & 0 & 0 & 0 \\ X_{40} & - & - & - & - & - & - & X_{47} \\ 0 & 0 & 0 & 0 & 0 & 0 & 0 & 0 \\ X_{60} & - & - & - & - & - & - & X_{67} \\ 0 & 0 & 0 & 0 & 0 & 0 & 0 & 0 \end{bmatrix}$$
FIG. 4
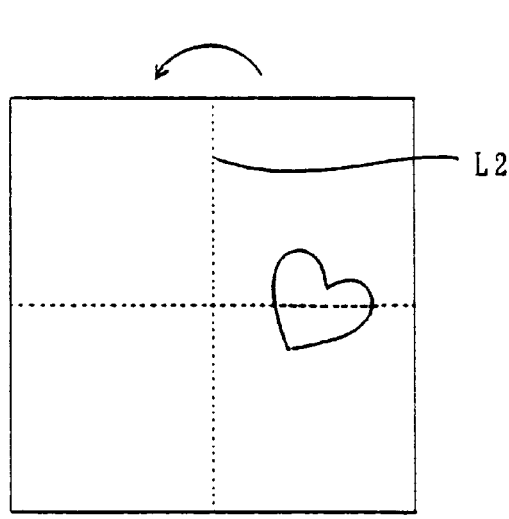
FIG. 5A
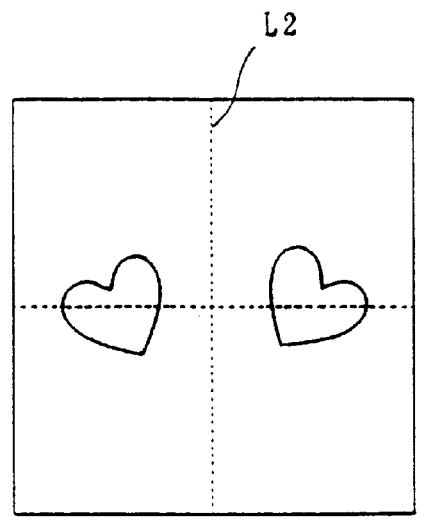
FIG. 5B

$$\begin{bmatrix} X_{00} & 0 & X_{02} & 0 & X_{04} & 0 & X_{06} & 0 \\ \vdots & 0 & \vdots & 0 & \vdots & 0 & \vdots & 0 \\ \vdots & 0 & \vdots & 0 & \vdots & 0 & \vdots & 0 \\ \vdots & 0 & \vdots & 0 & \vdots & 0 & \vdots & 0 \\ \vdots & 0 & \vdots & 0 & \vdots & 0 & \vdots & 0 \\ \vdots & 0 & \vdots & 0 & \vdots & 0 & \vdots & 0 \\ \vdots & 0 & \vdots & 0 & \vdots & 0 & \vdots & 0 \\ X_{70} & 0 & X_{72} & 0 & X_{74} & 0 & X_{76} & 0 \end{bmatrix}$$
FIG. 6
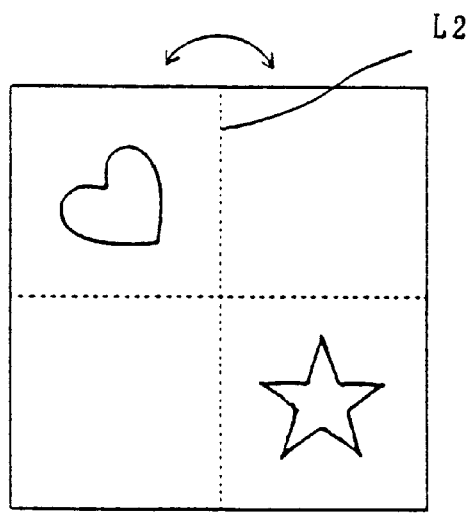
FIG. 7A
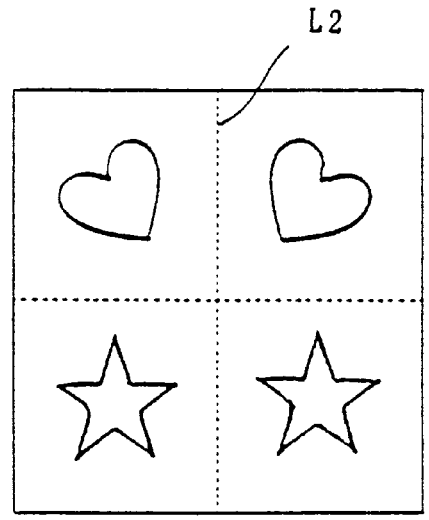
FIG. 7B

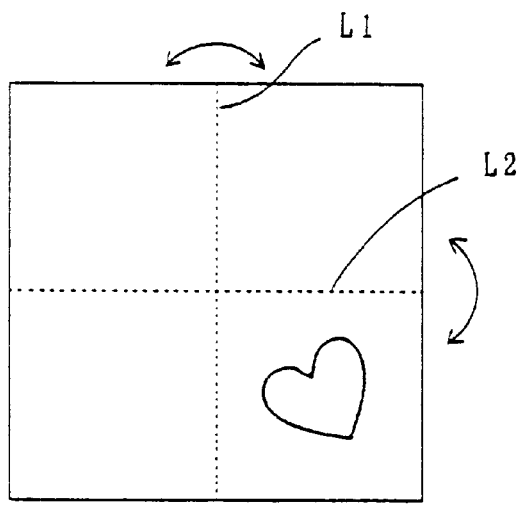
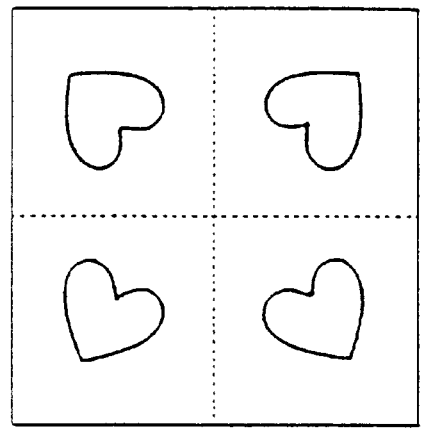
FIG. 8A　　　　FIG. 8B
$$\begin{bmatrix} X_{00} & 0 & X_{02} & 0 & X_{04} & 0 & X_{06} & 0 \\ 0 & 0 & 0 & 0 & 0 & 0 & 0 & 0 \\ X_{20} & 0 & X_{22} & 0 & X_{24} & 0 & X_{26} & 0 \\ 0 & 0 & 0 & 0 & 0 & 0 & 0 & 0 \\ X_{40} & 0 & X_{42} & 0 & X_{44} & 0 & X_{46} & 0 \\ 0 & 0 & 0 & 0 & 0 & 0 & 0 & 0 \\ X_{60} & 0 & X_{62} & 0 & X_{64} & 0 & X_{66} & 0 \\ 0 & 0 & 0 & 0 & 0 & 0 & 0 & 0 \end{bmatrix}$$
FIG. 9

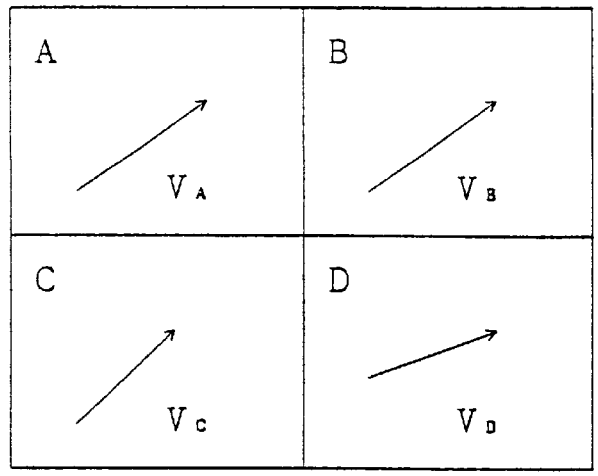
FIG. 14
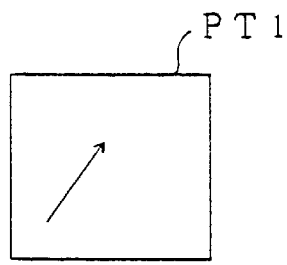
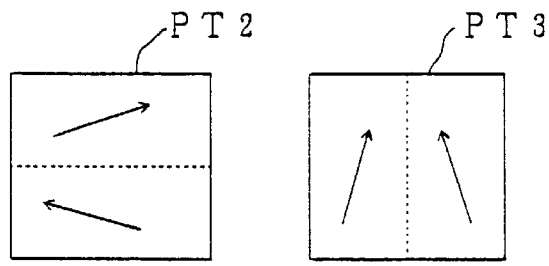
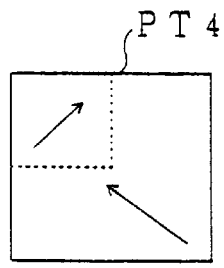 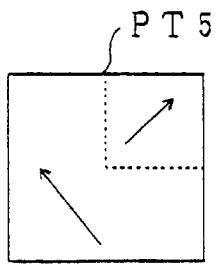 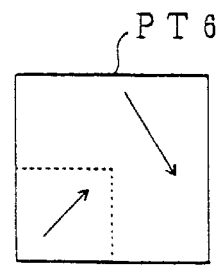 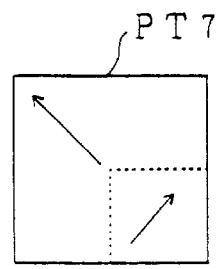
FIG. 15

TABLE 1

| VAB | VAC | VAD | VBC | VBD | VCD | PATTERN NO. |
|---|---|---|---|---|---|---|
| O | X | X | X | X | O | PT 2 |
| X | O | X | X | O | X | PT 3 |
| X | X | X | O | O | O | PT 4 |
| X | O | O | X | X | O | PT 5 |
| O | X | O | X | O | X | PT 6 |
| O | O | X | O | X | X | PT 7 |
| OTHER THAN THE ABOVE | | | | | | PT 1 |

FIG. 16

TABLE 2

| CODE | PATTERN NO. |
|---|---|
| 1 | PT 1 |
| 0 1 0 | PT 2 |
| 0 1 1 | PT 3 |
| 0 0 1 0 | PT 4 |
| 0 0 1 1 | PT 5 |
| 0 0 0 1 0 | PT 6 |
| 0 0 0 1 1 | PT 7 |

FIG. 17

| MEANING | CODE |
|---|---|
| VX = VX$_A$ | 001 |
| VX = VX$_B$ | 010 |
| VX = VX$_C$ | 011 |
| TRANSMIT VX-VX$_A$ | 100 |
| TRANSMIT VX-VX$_B$ | 101 |
| TRANSMIT VX-VX$_C$ | 110 |
| TRANSMIT VX | 111 |

| VLC code | | | |
|---|---|---|---|
| 0000 | 0011 | 001 | -16 |
| 0000 | 0011 | 011 | -15 |
| 0000 | 0011 | 101 | -14 |
| 0000 | 0011 | 111 | -13 |
| 0000 | 0100 | 001 | -12 |
| 0000 | 0100 | 011 | -11 |
| 0000 | 0100 | 11 | -10 |
| 0000 | 0101 | 01 | -9 |
| 0000 | 0101 | 11 | -8 |
| 0000 | 0111 | | -7 |
| 0000 | 1001 | | -6 |
| 0000 | 1011 | | -5 |
| 0000 | 111 | | -4 |
| 0001 | 1 | | -3 |
| 0011 | | | -2 |
| 011 | | | -1 |
| 1 | | | 0 |
| 010 | | | 1 |
| 0010 | | | 2 |
| 0001 | 0 | | 3 |
| 0000 | 110 | | 4 |
| 0000 | 1010 | | 5 |
| 0000 | 1000 | | 6 |
| 0000 | 0110 | | 7 |
| 0000 | 0101 | 10 | 8 |
| 0000 | 0101 | 00 | 9 |
| 0000 | 0100 | 10 | 10 |
| 0000 | 0100 | 010 | 11 |
| 0000 | 0100 | 000 | 12 |
| 0000 | 0011 | 110 | 13 |
| 0000 | 0011 | 100 | 14 |
| 0000 | 0011 | 010 | 15 |
| 0000 | 0011 | 000 | N/A |

FIG. 24

MOTION PICTURE SIGNAL COMPRESSING APPARATUS WHICH ENCODES THE MOTION VECTOR OF THE BLOCK OF A MOTION PICTURE SIGNAL PICTURE AS A MOTION VECTOR DIFFERENCE

This is a divisional of application Ser. No. 08/286,562, filed Aug. 5, 1994, now U.S. Pat. No. 5,510,841 which is a divisional application of Ser. No. 07/942,927, filed Sep. 10, 1992 now abandoned.

BACKGROUND OF THE INVENTION

This invention relates to an apparatus for compressing a picture signal, and an apparatus for expanding a compressed picture signal, and, more particularly, to an apparatus that is suitable for use in applications in which the picture signal being compressed is to be recorded, and in which the compressed picture signal being expanded has been reproduced.

It is known to compress a picture signal by dividing the picture signal into blocks of 8×8 pixels (=8 pixels×8 lines), and subjecting the blocks to processing by means of a discrete cosine transform (DCT), quantizing, and variable length coding the resulting transform coefficients, which are then recorded on a recording medium, e.g. a disc. The compressed picture signal recorded on the disc is then reproduced from the disc, variable length decoded, inverse-quantized, and inverse-discrete cosine transformed to reconstruct the original picture signal.

It is desirable to provide a recording medium that has a short access time and a large capacity because a motion picture, for example, requires that a large quantity of information to be stored. Presently, an NTSC video signal, for example, can be recorded on and reproduced from a conventional video disc. When it is desired to record the digital motion picture signal on a smaller disc than a conventional video disc, the motion picture signal must be subject to high efficiency compression, and the reproduced motion pictures signal must be capable of being expanded efficiently.

To answer this problem, there have been proposed some methods for compressing the motion picture signal to be recorded with high efficiency. One of these methods is that proposed by the moving picture experts group (MPEG). The MPEG method detects a motion vector for each block of the motion picture signal, and generates a prediction block by applying motion compensation to a prediction picture according to the motion vector. This reduces redundancy in the motion picture signal in the time domain. In addition, the block of prediction errors between each block of the present picture and its corresponding prediction block is subject to a discrete cosine transform, and the resulting transform coefficients are quantized, to reduce redundancy in the motion picture signal in the spatial domain.

Attempting to increase the compression efficiency by enlarging the quantizing step size by which the transform coefficients are quantized results in larger quantizing errors. Larger quantizing errors make noise the in flat portions of the picture (i.e. the portions of the picture in which there is little detail) more obvious.

Further, in a conventional apparatus for compressing a motion picture signal, the differential vector between the motion vectors of the target block and the left side block thereof is encoded on encoding the motion vector of prescribed each block. Therefore, when there are many targets to be imaged in a picture, the motions of which are different each other, the quantity of prediction error information between the current picture and the prediction picture is increased, which degrades the compression efficiency.

Furthermore, in this situation, there is a problem that different parts of the block can have motions that are different from each other, which degrades the prediction accuracy.

To remedy this problem, it has been suggested that each of the 8×8 blocks be divided into four 4×4 subblocks, that a motion vector be determined for each subblock, and that the motion of the block be compensated by using the resulting four motion vectors. However this proposal degrades the compression efficiency because of the increased number of motion vectors.

SUMMARY OF THE INVENTION

In view of the foregoing, an object of this invention is to provide an apparatus for compressing a motion picture signal and for expanding a compressed motion picture signal in which an original motion picture signal is compressed with high efficiency to provide a compressed signal that can be expanded to recover the original motion picture signal.

The foregoing object and other objects of the invention have been achieved by the provision of an apparatus for compressing a motion picture signal. The motion picture signal is divided into blocks. The apparatus comprises a circuit that subtracts the blocks of the motion picture signal from corresponding prediction blocks of a prediction picture to provide prediction error blocks; a circuit that orthogonally transforms the prediction error blocks to provide transform coefficients; a circuit that quantizes the transform coefficients to provide quantized transform coefficients; and a circuit that codes the quantized transform coefficients to provide coded transform coefficients. A local decoding circuit locally decodes the quantized transform coefficients to provide an additional prediction picture. A motion detector calculates a motion vector for each of plural subblocks obtained by dividing each block of the motion picture signal by at least four. A representative motion vector generating circuit generates plural representative motion vectors representing the motion vectors of the subblocks constituting each block. The representative motion vectors are generated from the motion vectors of the subblocks constituting the block, and are fewer in number than the number of subblocks constituting the block. Finally, the apparatus includes a motion compensator for producing the prediction blocks from the prediction picture by applying motion compensation to the prediction picture in response to the plural representative motion vectors.

The invention also provides a complementary expander for expanding a compressed motion picture signal. The compressed motion picture signal includes a compressed picture block obtained by compressing a block of a motion picture signal. The compressed picture block includes coded transform coefficients and coded vector data representing the block of the motion picture signal. The coded vector data includes plural representative motion vectors representing motion vectors of a number of subblocks obtained by dividing the block of the motion picture signal by at least four. The expander provides an output picture signal, and comprises a demultiplexer that separates the coded transform coefficients and the coded vector data from the compressed picture block. A vector decoder detects and decodes the plural representative motion vectors in the coded vector data. The vector decoder decodes fewer representative motion vectors than the number of subblocks. A calculating circuit calculates the motion vectors of the subblocks from the representative motion vectors. Finally, a circuit derives a block of the output picture signal from the coded transform coefficients and the motion vectors.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are schematic views illustrating a block consisting of flat subblocks and unflat subblocks;

FIGS. 3A and 3B are schematic views for explaining folding in a block that includes flat subblocks and unflat subblocks in its lower and upper parts, respectively;

FIG. 4 is a table showing the DCT coefficients generated by the folding shown in FIGS. 3A and 3B;

FIGS. 5A and 5B are schematic views for explaining folding in a block that includes flat subblocks and unflat subblocks in its left and right parts, respectively;

FIG. 6 is a table showing the DCT coefficients generated by the folding shown in FIGS. 5A and 5B;

FIGS. 7A and 7B are schematic views for explaining folding in a block that includes diagonally-opposed flat subblocks and unflat subblocks;

FIGS. 8A and 8B are schematic views for explaining folding in a block that includes only one unflat subblock;

FIG. 9 is a table showing the DCT coefficients generated by the folding shown in FIGS. 8A and 8B;

FIG. 14 is a schematic view illustrating a block divided into four subblocks;

FIG. 15 is a schematic view for explaining the method by which two representative vectors represent the motion vectors of the four subblocks shown in FIG. 14;

FIG. 16 is a table for explaining how the different patterns shown in FIG. 15 are detected in response to the differential vectors;

FIG. 17 is a table for explaining how the different patterns shown in FIG. 15 are coded;

FIG. 24 is a table illustrating the variable length coding adopted for the vector value in the embodiment shown in FIG. 1;

DETAILED DESCRIPTION OF THE INVENTION

Figure 1:
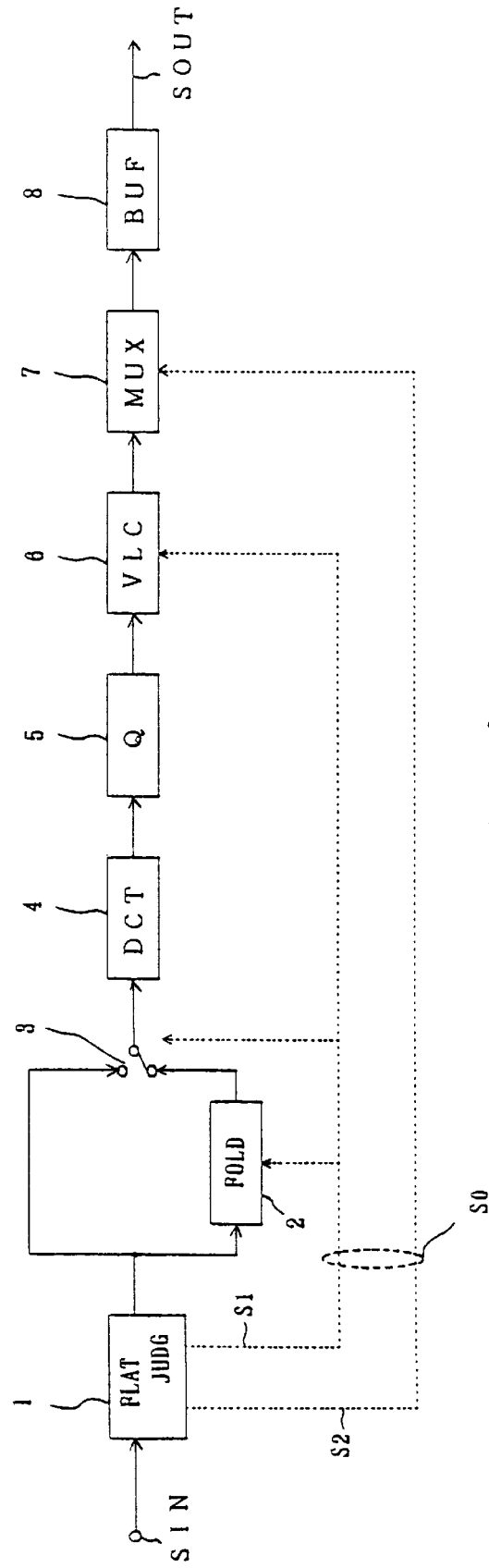
FIG. 1 is a block diagram illustrating the construction of a first embodiment of an apparatus for compressing a picture signal according to the present invention.

Preferred embodiments of this invention will be described with reference to the accompanying drawings:

FIG. 1 shows a block diagram illustrating the construction of one embodiment of an apparatus according to the present invention for compressing a motion picture signal. The principles of the apparatus will be described first. Discrete cosine transform (DCT) processing is applied to blocks of the motion picture signal consisting of, e.g., 8×8 pixels (8 pixels×8 lines). When a discrete cosine transform is applied to a block of the motion picture signal, many of the resulting transform coefficients are zero. Therefore, the number of bits of the compressed picture signal required to represent the transform coefficients can be reduced by including in the compressed picture signal data indicating the number of transform coefficients that are zero. This enables more bits to be allocated for quantizing the non-zero transform coefficients, which, in turn, reduces the quantizing noise. The apparatus shown in FIG. 1 is constructed to reduce further the volume of the compressed picture signal required to represent the transform coefficients by increasing the number of zero transform coefficients.

FIGS. 2A and 2B show a block composed of 8×8 pixels segmented into four subblocks, each consisting of 4×4 pixels. Then, the flatness of each subblock is measured. "Flatness," as used herein, indicates that the variation in the pixel values within the subblock is small.

FIGS. 2A and 2B depict, as an example, an object, the balloon GX, in the right two subblocks, whereas the left two subblocks are devoid of any detail. More specifically, in this instance, the left two subblocks are deemed to be flat subblocks, while the right two blocks are deemed to be unflat subblocks. A flat subblock is indicated by a logical 1, whereas an unflat subblock is indicated by a logical 0. The flatness of the block shown in FIG. 2A may therefore be indicated as shown in FIG. 2B.

The flatness of each subblock is indicated by a logical 0 or a logical 1. Consequently, one block consisting of four subblocks can have 16 (=2×2×2×2) possible patterns of flat/unflat subblocks. Hence, flatness information of one block can be indicated by a 4-bit word.

For example, in FIG. 3A, a heart-shaped object is depicted in the upper two subblocks, whereas the lower two subblocks are devoid of any detail. In this case, the flatness of the upper two subblocks is indicated by a logical 0, whereas the flatness of the lower two subblocks is indicated by a logical 1. In this instance, the unflat upper two subblocks are folded over the flat lower two subblocks about the horizontal center line L1. This results in the picture shown in FIG. 3B. When a block that is symmetrical between its upper and lower halves, i.e., about the center line L1, is discrete cosine transform processed, alternate rows of the resulting discrete cosine transform coefficients (transform coefficients) are all zero, as shown in FIG. 4. Thus, the transform coefficients in alternate (even-numbered) lines are all zero.

Further, in FIG. 5A, a heart-shaped object is shown in the right two subblocks in the block, whereas the left two subblocks are devoid of any detail. In this instance, the unflat subblocks are folded over the flat subblocks about the vertical center line L2. This results in the picture shown in FIG. 5B. When DCT processing is applied to the block shown in FIG. 5B, alternate columns of the resulting transform coefficients are all zero, as shown in FIG. 6.

In a further example, FIG. 7A shows a heart-shaped object and a star-shaped object in the left upper subblock and in the right lower subblock, respectively, of the block, whereas the right upper and left lower subblocks are devoid of detail. In this case, the picture illustrated in FIG. 7B results from folding the block about the vertical center line L2. Applying DCT processing to this block also results transform coefficients, alternate columns of which are zero, as shown in FIG. 6.

In a yet further example, FIG. 8A shows a heart-shaped object in only the right lower subblock, whereas the remaining three subblocks are devoid of detail. In this case, left subblocks are folded over the right subblocks along the vertical center line L1, and the upper subblocks are folded over the lower subblocks along the horizonal line L2. The resulting block is illustrated in FIG. 8B. When DCT processing is applied to the block illustrated in FIG. 8B, alternate rows and alternate columns of the resulting transform coefficients are all zero, as illustrated in FIG. 9. In other words, the transform coefficients shown in FIG. 4 are synthesized with the transform coefficients shown in FIG. 6.

Determining the flatness of the subblocks in a block, and, when two or more subblocks are flat, performing one or more folding operations to increase the symmetry of the block, as described above, increases the number of zero transform coefficients when the block is DCT processed. This increases the number of quantizing bits available to represent the other, non-zero, transform coefficients in the compressed picture signal. Instead of including in the compressed picture signal data for each zero transform coefficient, data are included indicating the number of zero transform coefficients resulting from the DCT transform of the block. Since the zero transform coefficients are known from the flatness information, the number of bits available to represent the non-zero transform coefficients can be increased.

Figure 10:
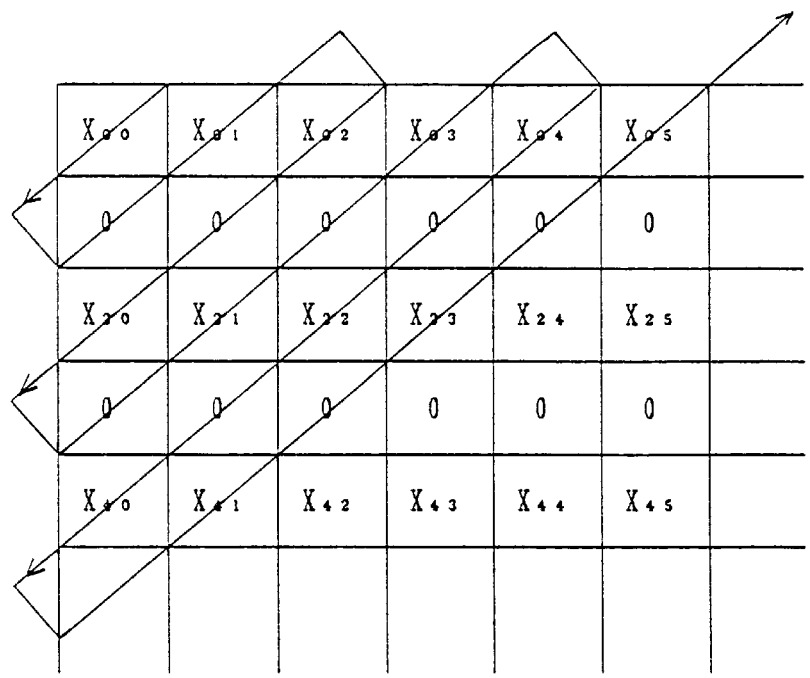
FIGS. 10A and 10B are schematic views for explaining a zigzag scan.
Figure 10:
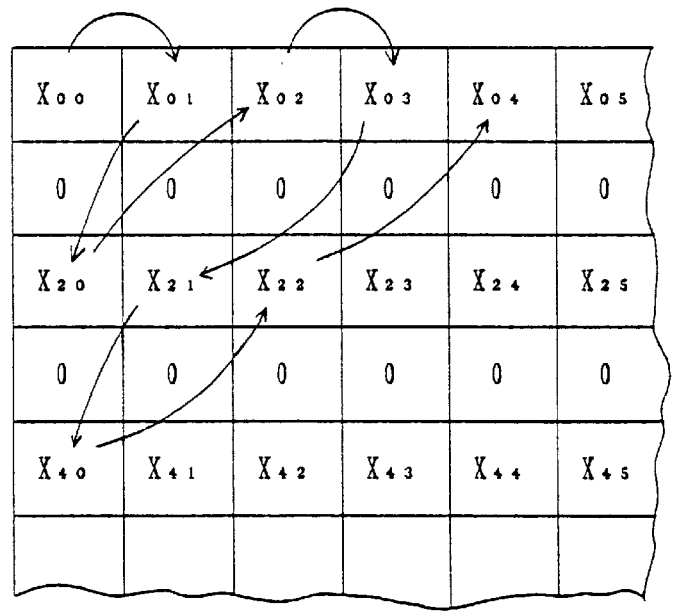

The block of transform coefficients can be read using a zigzag scan along lines at 45 degrees to the block, as shown in, e.g., FIG. 10A. The resulting non-zero coefficients and data indicating the number of zero transform coefficients are included in the compressed picture signal. In accordance with the embodiment discussed above, however, rows and columns in which all of the transform coefficients are zero appear periodically, and the locations of these rows and columns are known in advance. Hence, as illustrated in FIG. 10B, the zigzag-scan can be performed by skipping the rows and/or columns in which the transform coefficients are known to be zero. This way, the number of bits required to represent the transform coefficients in the compressed picture signal can be reduced.

In the apparatus shown in FIG. 1 for compressing a motion picture signal, the input picture signal SIN is supplied to the flat block judgment circuit 1, where it is divided into blocks, each block is segmented into subblocks, and the flatness of each subblock is judged. Then, the flat block judgment circuit 1 supplies the folding circuit 2, the switch 3, the variable length coder 6, and the signal multiplexer 7 with 4-bit flatness information S1, which indicates which of the four subblocks constituting the block is flat. Further, the flat block judgment circuit 1 calculates a representative value S2 of the flat subblocks, which it feeds to the signal multiplexer 7.

Each block of the motion picture signal is fed from the flat block judgment circuit 1 to the switch 3 either directly, or via the folding circuit 2, and thence to the discrete cosine transform (DCT) circuit 4. The transform coefficients from the DCT circuit 4 are supplied to the quantizer 5, where they are quantized. The quantized transform coefficients from the quantizer 5 are supplied to the variable length coder 6, and the output thereof is supplied to the signal multiplexer 7. In the signal multiplexer, the coded transform coefficients are multiplexed with the representative value S2 from the flat block judgment circuit 1. The multiplexed output is supplied to the output buffer 8, where it is temporarily stored. The compressed picture signal Sout is read out from the output buffer 8 for recording on a suitable recording medium (not shown), such as a disc.

Next, the operation of the circuit will be explained. The flat block judgment circuit 1 segments the input motion picture signals into blocks of 8×8 pixels (8 pixels×8 lines). Then, each block is segmented into four subblocks, each having 4×4 pixels (4 pixels×4 lines). Additionally, the flatness of each of the four subblocks is judged. To determine the flatness of a subblock, for instance, if the difference between the maximum and the minimum of the pixel values in the subblock is smaller than a preset reference value, the subblock is judged to be flat. Alternatively, the flatness can be also judged from, e.g., the dispersion within the subblock. As explained above, the flatness information for each block, indicating the ones of the four subblocks constituting the block that are flat is a 4-bit code, as stated above.

The flat block judgment circuit 1 also computes the representative value of each of the subblocks judged to be flat, and feeds each representative value S2 to the signal multiplexer 7. The representative value can be the left upper element A00 in FIG. 11B, which corresponds to the DC component of the transform coefficients. Alternatively, the representative value of the subblock can be the mean of the pixel values in the subblock. In this case, the 16 pixel values within the subblock are added together, and the resulting sum is divided by 16 (4×4) to calculate the representative value. One representative value can be provided for each subblock; or one representative value can be provided for each block.

Figure 11:
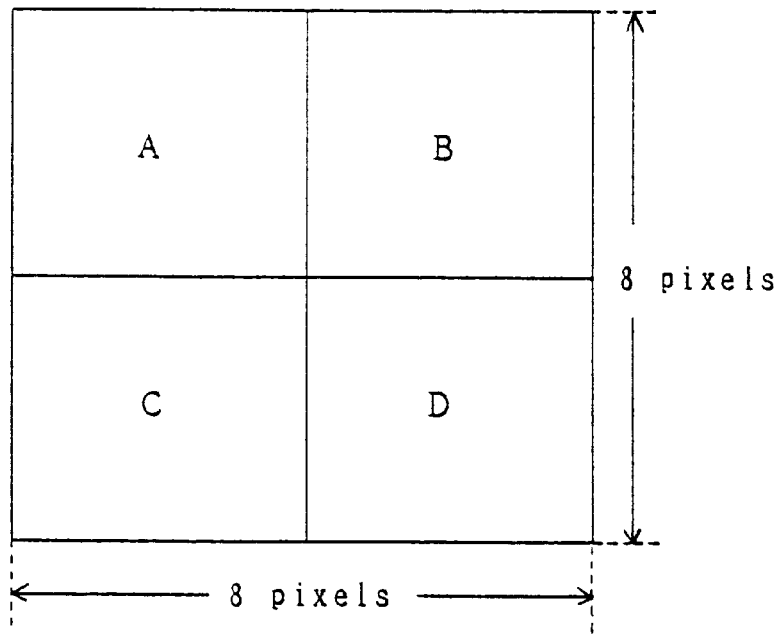
FIGS. 11A and 11B are a schematic view of a block and a table of the pixel values thereof, respectively.

The folding circuit 2 folds each block of the motion picture signal from the flat block judgment circuit 1, in response to the flatness information supplied by the flat block judging circuit 1. For example, in the block shown in FIG. 11A, if the three subblocks A, B and C are flat, and the subblock D is unflat, the folding process shown in FIGS. 8A and 8B is performed. If the pixel values in subblocks A' through D' of the block obtained by folding are indicated by a'ij, b'ij, c'ij, d'ij, respectively, these pixel values are computed by the following formulae:

$$a'_{ij} = d(3-i)(3-j) \quad (1)$$

$$b'_{ij} = d(3-i)j \quad (2)$$

$$c'_{ij} = di(3-j) \quad (3)$$

$$d'_{ij} = dij \quad (4)$$

where, as shown in FIG. 11B, dmn represents the pixels of the subblock D shown in FIG. 11A before the folding process is executed.

The switch 3 switches between its upper and lower contacts as shown in the figure in accordance with the flatness information supplied from the flat block judgment circuit 1. Consequently, blocks of the motion picture signal before being folded, or blocks of the folded picture signal are fed to the discrete cosine transform circuit 4 as required. The discrete cosine transform circuit 4 applies discrete cosine transform processing to each block of folded or non-folded motion picture signal. The resulting transform coefficients from the discrete cosine transform circuit 4 are supplied to the quantizer 5, where they are quantized using a predetermined quantizing step size.

The quantized transform coefficients 5 are supplied from the quantizer 5 to the variable-length coder 6, where they are variable-length coded. The variable-length coder 6, described above with reference to FIG. 10B, reads each block of transform coefficients by performing a zigzag-scan, and skipping the rows and/or columns in which all the transform coefficients are zero as a result of the folding. This way, the transform coefficients are variable-length coded. The flat block judgment circuit 1 supplies the variable-length coder 6 with the flatness information S1 to tell the variable-length coder which rows and/or columns are to be skipped. The variable-length coder 6 determines from the flatness information S1 how the folding was performed, and, hence, the rows and/or columns of zero transform coefficients resulting from transforming the folded block.

The variable-length coded coefficients from the variable-length coder 6 are supplied to the signal multiplexer 7, where they are multiplexed with the representative value of the subblock S2 supplied by the flat block judgment circuit 1. The resulting multiplexed signal is supplied to the output buffer 8, whence the compressed picture signal is subsequently read for recording on the disc (not shown).

Figure 12:
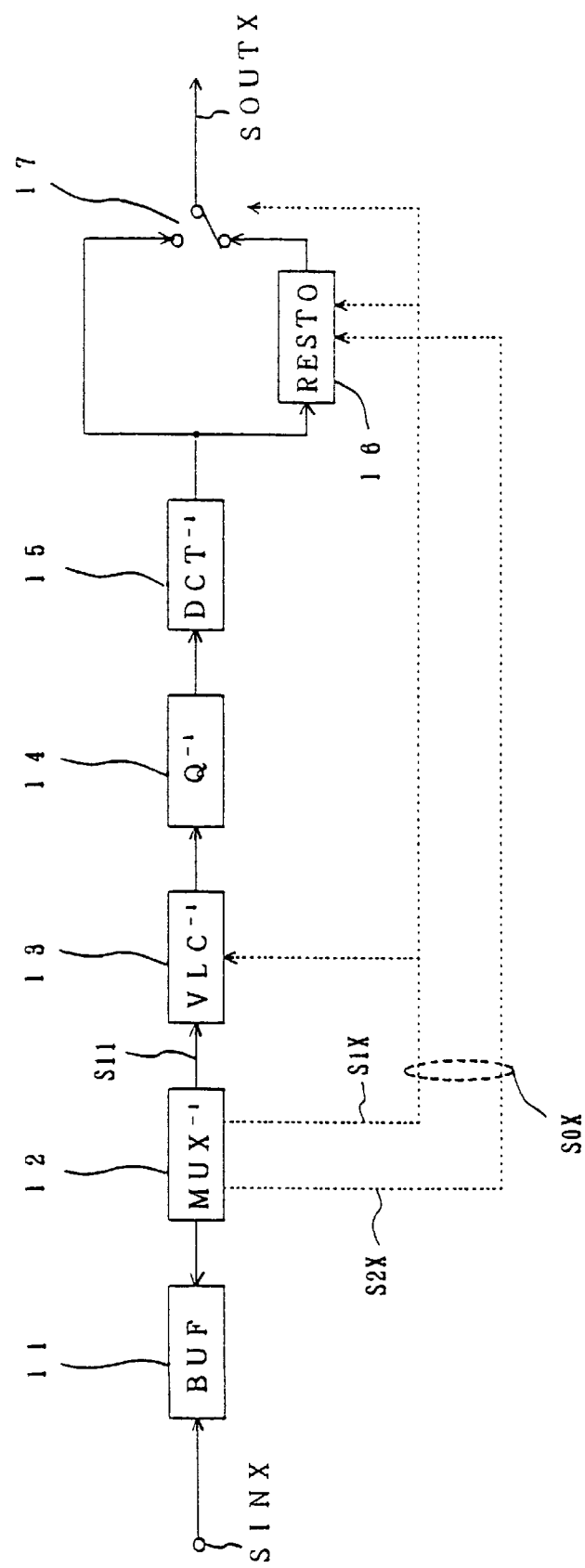
FIG. 12 is a block diagram illustrating an apparatus for expanding a compressed picture signal compressed by the apparatus shown in FIG. 1 for compressing a picture signal.

FIG. 12 shows the construction of one embodiment of an apparatus for expanding the compressed picture signal compressed by the apparatus shown in FIG. 1 for compressing a motion picture signal. In the apparatus shown in FIG. 12, the input buffer 11 temporarily stores the compressed picture signal reproduced from the recording medium (not shown), such as a disc. The demultiplexer 12 separates the compressed picture signal received from the input buffer 11 into blocks of coded transform coefficients, representative values, and flatness information. The variable-length coding of the coded coefficients S11 from the demultiplexer 12 is reversed by the inverse variable length coder 13, and the quantizing of the resulting quantized transform coefficients is reversed by the inverse quantizer 14. The inverse discrete cosine transform circuit 15 applies an inverse discrete cosine transform to each block of transform coefficients from the inverse quantizer 14, and the resulting block of pixel values is fed to the switch 17 directly, and via the restoring circuit 16. The restoring circuit restores those subblocks of pixel values that are flat blocks to picture blocks using the representative value S2X from by the demultiplexer 12. The switch 17 selects blocks of pixel values from the output of the restoring circuit 16 or from the output of the inverse discrete cosine transform circuit 15 in response to the flatness information S1X.

The operation of the apparatus for expanding the compressed picture signal will now be described. The demultiplexer 12 separates the coded transform coefficients from the compressed picture signal read out of the input buffer 11, and supplies them to the inverse variable-length coder 13. The demultiplexer 12 also separates the representative value S2X and the flatness information S1X from the compressed picture signal. The flatness information S1X is fed to the inverse variable-length coder 13, the restoring circuit 16, and the switch 17, while the representative value S2X is fed to the restoring circuit 16.

The inverse variable-length coder 13 applies inverse variable-length coding processing to the coded transform coefficients from the demultiplexer 12. The inverse variable-length coder, in accordance with the flatness information S1X from the demultiplexer 12, inserts zeroes into the rows and/or columns of quantized transform coefficients that were skipped in the compressor as a result of folding. The inverse quantizer 14 inversely quantizes the quantized transform coefficients from the inverse variable-length coder 13, and feeds the resulting transform coefficients to the inverse discrete cosine transform circuit 15. The inverse discrete cosine transform circuit 15 applies inverse discrete cosine transform processing to each block of transform coefficients from the inverse quantizer 14, and provides corresponding blocks of pixel values.

As stated above, some of the blocks of pixel values are obtained as a consequence of folding in the compressor. For these blocks, in response to the flatness information S1X, the restoring circuit 16 replaces the flat subblock data, which was suppressed by folding in the compressor, with the representative value S2X from the demultiplexer 12. The subblocks suppressed by folding are thereby restored. The switch 17 selects either the output of the restoring circuit 16, or the output of the inverse discrete cosine transform circuit 15. An output signal corresponding to the original motion picture signal is therefore restored and fed to the output terminal.

In the system just described, the representative pixel value of the flat subblocks is included in the compressed picture signal in lieu of the coded transform coefficients of the flat subblocks. However, transmitting no representative pixel value is also possible. In this case, only the flatness information which specifies the flat subblocks is transmitted. In this instance, in the expander, the inverse discrete cosine transformation is executed first, to provide the respective pixel values. Then, the pixel values in the flat subblocks are obtained by smoothing accordance with the flatness information. The smoothing method involves, e.g., replacing the respective pixel values or clipping the pixel values in a predetermined range. If no representative pixel values are included in the compressed picture signal, it is impossible to reduce the number of transform coefficients by folding.

In the embodiment described above, the blocks of the motion picture signal are DCT processed. However, the folding process just described can be used to reduce the number of bits in the compressed picture signal can be used with any transform method in which multiple zero coefficients result from transforming a symmetrical block as in, e.g., a Hadamard transform. Further, the present invention is, as a matter of course, applicable to a still picture signal, and is not simply limited to a motion picture signal.

Figure 13:
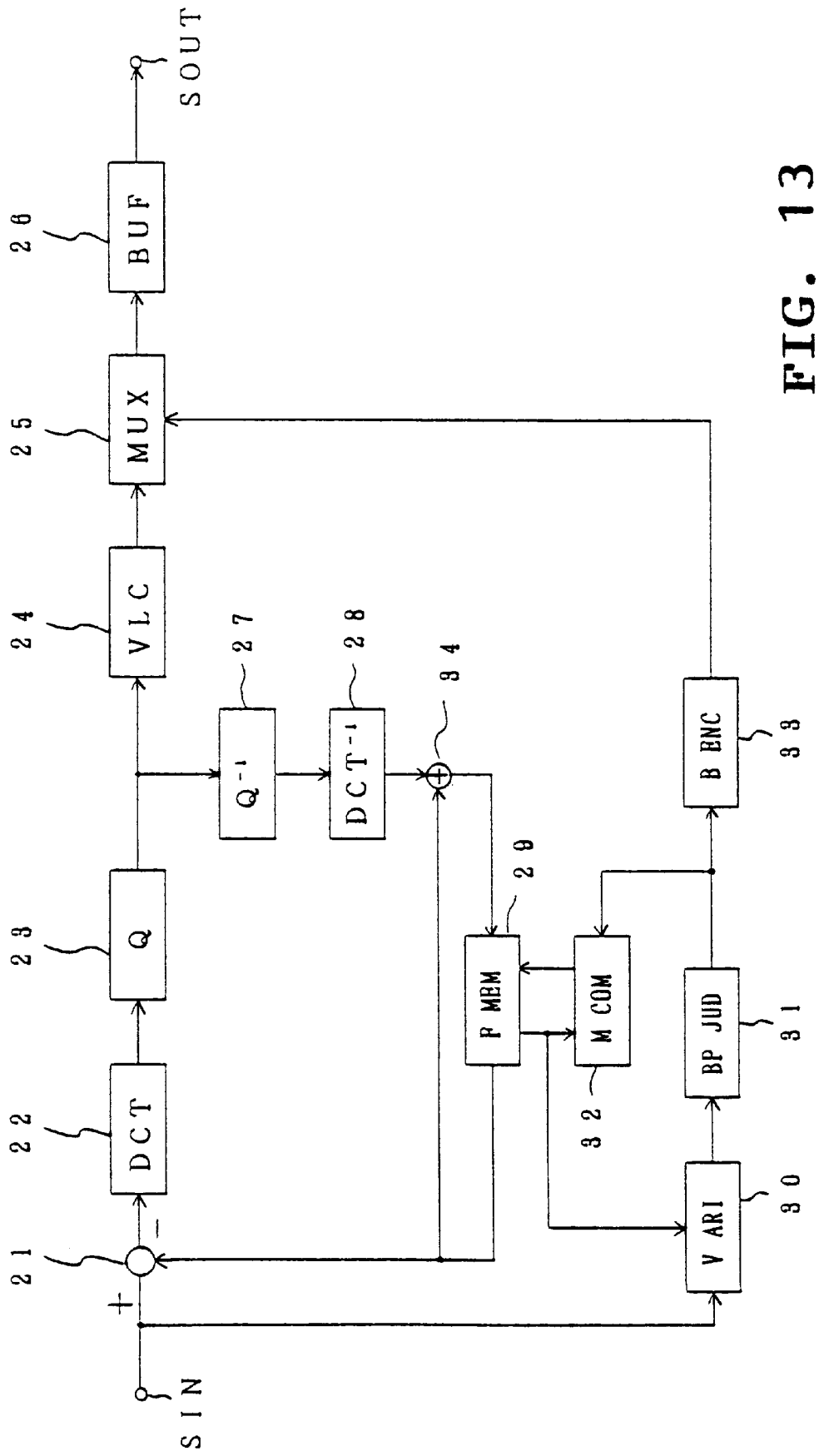
FIG. 13 is a block diagram illustrating the construction of a second embodiment of an apparatus for compressing a picture signal according to the present invention.

Next, FIG. 13 is a block diagram illustrating the second embodiment of an apparatus according to the present invention for compressing a motion picture signal.

In FIG. 13, the discrete cosine transform circuit 22 applies DCT processing to blocks of the motion picture signal SIN, or to a block of prediction errors between a block of the motion picture signal, and a corresponding prediction block of a prediction picture, generated by the subtraction circuit 21. The quantizer 23 quantizes the resulting transform coefficients from the DCT circuit 22. The variable-length coder 24 applies variable-length coding to the resulting quantized transform coefficients. The quantized transform coefficients from the quantizer 23 are fed to the inverse quantizer 27, where they are inversely quantized. The inverse discrete cosine transform circuit 28 applies inverse DCT processing to the resulting transform coefficients to provide a block of a reconstructed prediction errors. The block of reconstructed prediction errors is fed into the adder 34, where it is added to the prediction block. The resulting reconstructed picture block is stored in the frame memory 29 as a block of a prediction picture.

The vector arithmetic unit 30 segments the blocks of 8×8 pixels (8 pixels×8 lines) of the motion picture signal into four subblocks A, B, C and D, each having 4×4 pixels (4 pixels×4 lines). The vector arithmetic unit 30 also computes a motion vector VA, VB, VC, and VD for each subblock, using the prediction pictures stored in the frame memory 29. This is shown in FIG. 14.

The vector arithmetic unit 30 also computes the following values:

the value VAB of the differential vector between the motion vector VA of the subblock A and the motion vector VB of the subblock B, $$VAB = |vector\ VA - vector\ VB| \quad (5)$$

the value VAC of the differential vector between the motion vector VA of the subblock A and the motion vector VC of the subblock C, $$VAC = |vector\ VA - vector\ VC| \quad (6)$$

the value VAD of the differential vector between the motion vector VA of the subblock A and the motion vector VD of the subblock D, $$VAD = |vector\ VA - vector\ VD| \quad (7)$$

the value VBC of a differential vector between the motion vector VB of the subblock B and the motion vector VC of the subblock C, $$VBC = |vector\ VB - vector\ VC| \quad (8)$$

the value VBD of a differential vector between the motion vector VB of the subblock B and the motion vector VD of the subblock D, and $$VBD = |vector\ VB - vector\ VD| \quad (9)$$

the value VCD of a differential vector between the motion vector VC of the subblock C and the motion vector VD of the subblock D.

$$VCD = |vector\ VC - vector\ VD| \quad (10)$$

The vector arithmetic unit 30 then compares the values of the differential vectors with a predetermined threshold THR, and feeds the results to the block pattern judging unit 31. The block pattern judging unit 31 selects one of the motion vectors VA, VB, VC, or VD of the subblocks A, B, C, or D as each of the one or two representative vectors shown in FIG. 15 for instance.

In FIG. 15, the first pattern PT1 requires a single representative motion vector to represent the motion vectors VA, VB, VC, and VD of the four subblocks. The pattern PT1 is the same as if motion compensation were applied to the complete block.

The second pattern PT2 requires two representative motion vectors to represent the sets of motion vectors VA and VB, and VC and VD, respectively. The third pattern PT3 requires two representative motion vectors to which represent the sets of motion vectors VA and VC, and VB and VD, respectively.

The fourth pattern PT4 requires two representative motion vectors, one of which represents motion vector VA and is, for instance the motion vector VA itself, the other of which represents the set of motion vectors VB, VC and VD. The fifth pattern PT5 requires two representative motion vectors, one of which represents motion vector VB, and is, for instance, motion vector VB itself, the other of which represents the set of motion vectors VA, VC and VD. The sixth pattern PT6 requires two representative motion vectors, one of which represents motion vector VC, and is, for instance, motion vector VC itself, the other of which represents the set of motion vectors VA, VB and VD. The seventh pattern PT7 requires two representative motion vectors, one of which represents motion vector VD, and is, for instance, motion vector VD itself, the other of which represents the set of motion vectors VA, VB and VC.

The block pattern judging unit 31, in response to the results from the vector arithmetic unit 30, selects one of the available patterns according to Table 1 (FIG. 16). The block pattern judging circuit feeds a selected pattern signal, indicating the selected pattern, into the motion compensation circuit 32, which, in response to the selected pattern signal and the representative motion vectors, performs motion compensation on the prediction pictures stored in the frame memory 29.

Note that in the Table 1 of FIG. 16, a 0 indicates when the value of the differential vector is smaller than the threshold THR, and an X indicates when the value of the differential vector is larger than the threshold THR.

The selected pattern signal is also fed into the vector encoder 33. Based on, e.g., Table 2, shown in FIG. 17, the vector encoder generates the appropriate variable-length selected pattern code to indicate the selected pattern. The selected pattern code is fed into the multiplexer 25, where it is multiplexed with the code from the variable-length coder 24.

Next, the operation of the apparatus described above will be described. To reduce redundancy in the time domain, the subtractor 21 derives a block of prediction errors between a block of the current picture and a corresponding prediction block of a prediction picture read out of the frame memory 29. The block of prediction errors is fed into the discrete cosine transform (DCT) circuit 22. The DCT circuit 22 applies a discrete cosine transform to the block of prediction errors, and feeds the resulting transform coefficients into the quantizer 23. The quantizer quantizes the transform coefficients, and the resulting quantized transform coefficients are then variable-length coded by the variable-length coder (VLC) 24. The resulting coded transform coefficients are then fed to the output terminal via the multiplexer 25 and the output buffer 26.

In addition, the inverse quantizer 27 and the inverse DCT circuit 28 respectively apply inverse quantizing and an inverse discrete cosine transform to the quantized transform coefficients from the quantizer 23, and the resulting block of reconstructed prediction errors is fed to the adder 34. The block of reconstructed prediction errors supplied to the adder 34 is a reconstruction of the block of prediction errors produced by the subtractor 21.

The motion compensation circuit 32 performs motion compensation on the prediction picture, for example, the previous picture, in response to the selected pattern signal and the representative motion vectors from the block pattern judging unit 31. The prediction block, which is a block of the prediction picture to which motion compensation has been applied according to the selected pattern signal and the representative motion vectors, is read out from the frame memory 29 and fed to the adder 34 and the subtractor 21. The adder 34 adds the prediction block to the block of reconstructed prediction errors from the inverse DCT circuit 28, and the resulting reconstructed picture block is supplied to the frame memory 29, where it is stored as a block of another prediction picture.

To generate the prediction block, the motion picture input signal, (e.g. a digital video signal) is fed into the vector arithmetic unit 30, where the above-mentioned motion vectors VA, VB, VC, and VD of the four subblocks A, B, C, and D, respectively, are computed and detected. The vector arithmetic unit additionally calculates the magnitudes VAB, VAC, VAD, VBC, VBD, and VCD of the differences between pairs of these vectors, i.e. the differential vectors. The resulting vectors and differential vectors are fed into the block pattern judging unit 31, wherein the block pattern for each block is selected. More specifically, the magnitudes of the differential vectors are compared to the threshold THR to determine which of the patterns PT1 through PT7 to apply in accordance with the selection rules shown in Table 1 (FIG. 16).

The resulting selected pattern signal is fed into the vector encoder 33, wherein the selected pattern signal is coded using, for example, the variablelength codes shown in Table 2 (FIG. 17). The coded pattern signal is fed into the multiplexer 25, where it is multiplexed with the coded transform coefficients, as described above. In addition, as described above, the selected pattern signal is also fed into the motion compensator 32, where it employed for providing motion compensation.

Figure 18:
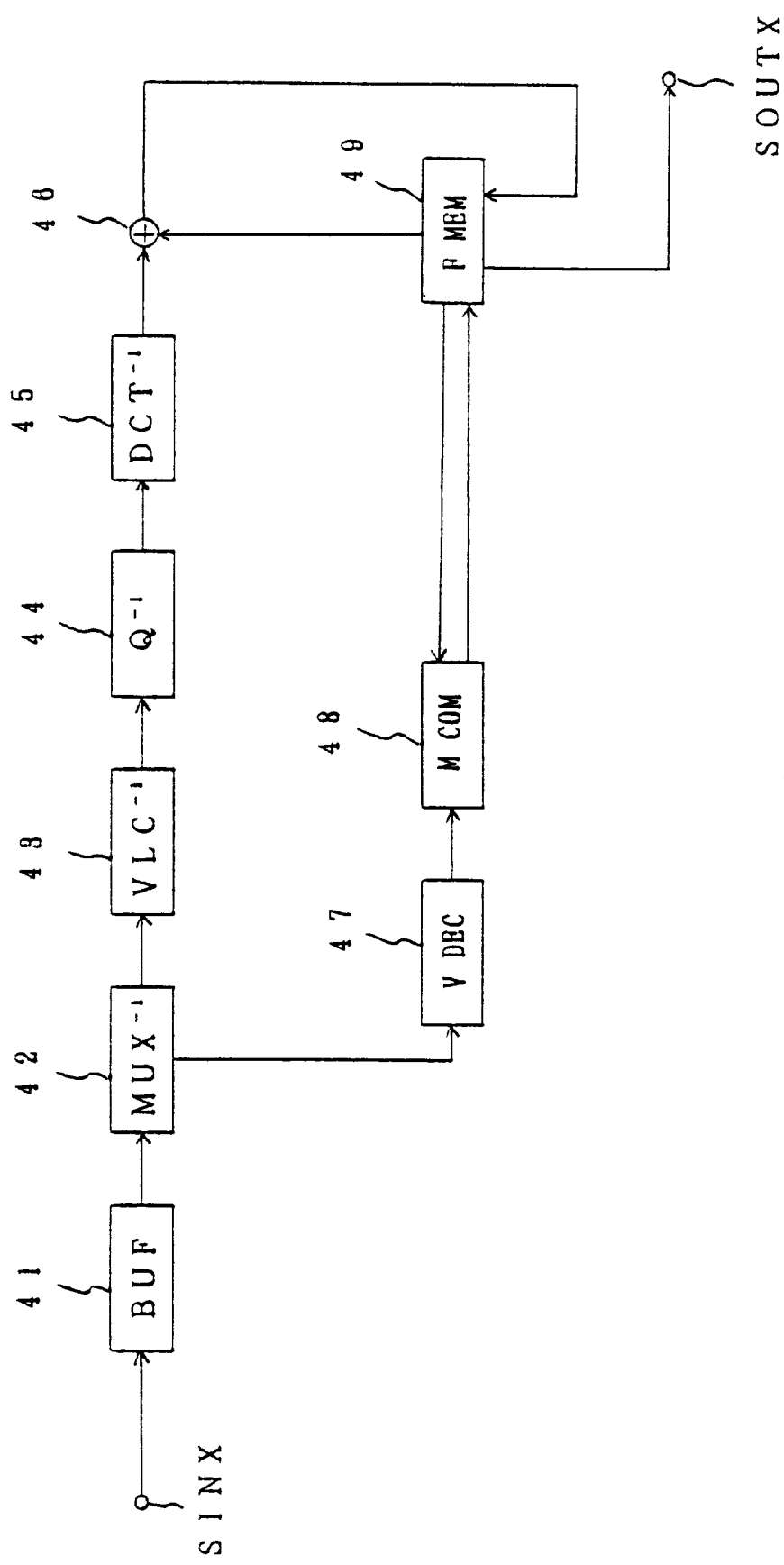
FIG. 18 is a block diagram illustrating the construction of one embodiment of an apparatus for expanding a compressed picture signal compressed by the apparatus shown in FIG. 13 for compressing a picture signal.

Next, FIG. 18 is a block diagram illustrating an embodiment of an apparatus for expanding the compressed motion picture signal compressed by the motion picture signal compressor shown in FIG. 13. The compressed motion picture signal SINX is fed into the demultiplexer 42 through the input buffer 41. In the demultiplexer, the compressed motion picture signal is separated into coded transform coefficients and coded pattern information. The coded transform coefficients are fed into the inverse variable-length coder (VLC) 43 where the variable-length coding is decoded. The resulting quantized transform coefficients are inversely quantized by the inverse quantizer 44, and the resulting transform coefficients are inverse discrete cosine transformed by the inverse discrete cosine transform circuit 45.

The resulting blocks of prediction errors are, in the same way as in the local decoder in the compressor, added to the corresponding prediction block from the frame memory 49, and stored as a block of a new prediction picture in the frame memory 49.

The coded selected pattern signal is fed into the pattern information decoder 47, where it is thereby decoded to provide a selected pattern signal and motion vectors. This information is fed into the motion compensator 48, where it is used to apply motion compensation to the prediction picture in the frame memory 48. In this manner, the compressed motion picture signal is expanded to reconstruct the original motion picture signal.

Figure 19:
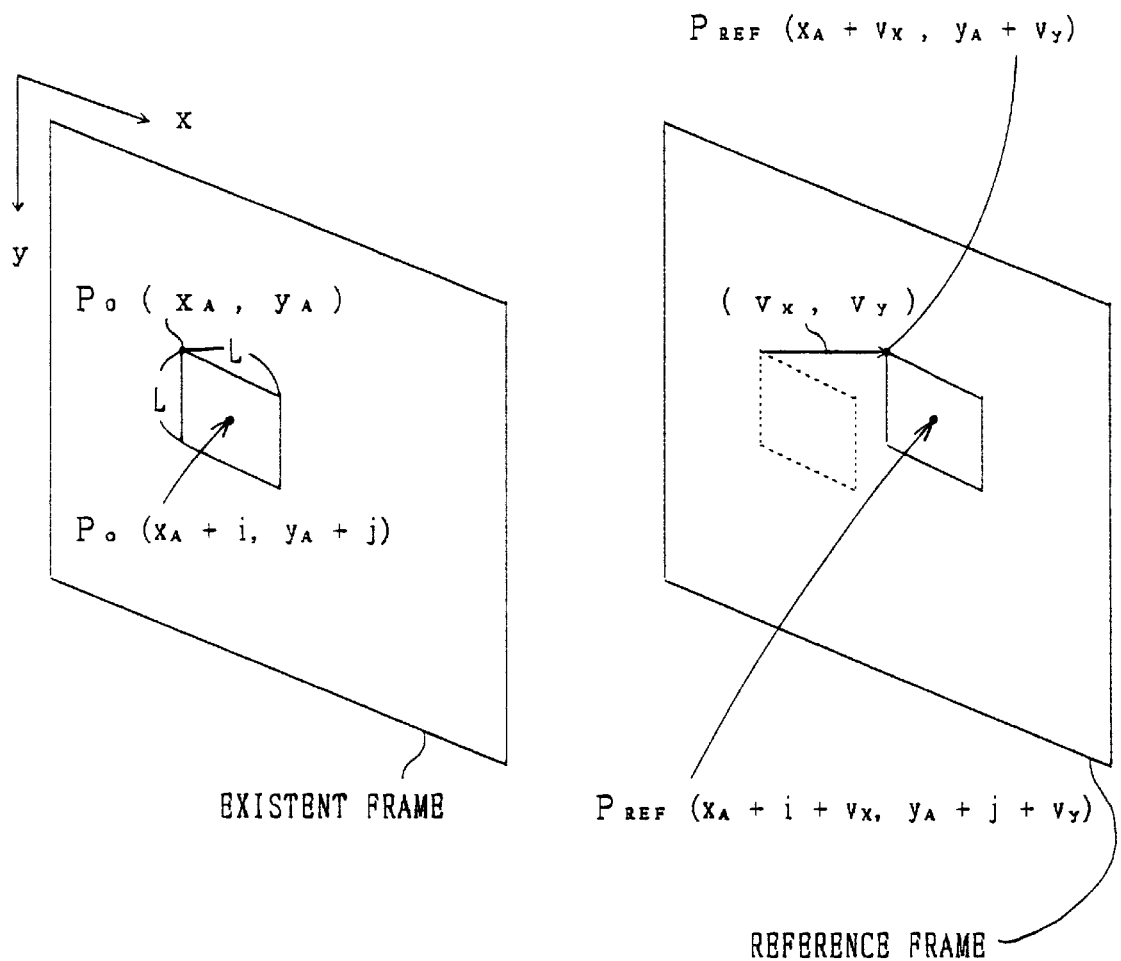
FIG. 19 is a schematic view for explaining the evaluation of a representative vector.

Referring now to FIG. 19, a practical example of a method for calculating a representative motion vector will be described. The representative motion vector is determined by performing block matching between the current block and the prediction picture in each of the two areas into which the current block is divided. The block matching results in the absolute difference sum between the area and the prediction picture being a minimum. The respective symbols are defined as follows:

PO (x, y): pixel value of coordinates in the current picture

PREF (x, y): pixel value of coordinates of the prediction block in the prediction picture (xA, yA): coordinates of left upper corner of subblock A (vX, vY): motion vector L: number of pixels of one side of the subblock vLIMIT: search range of motion vector Let sumA (vX, vY) be the absolute difference sum of the subblock A when the motion vector is (vX, vY). SumA (vX, vY) is expressed as follows:

$$sumA(vX, vY) = \sum_{j=0}^{L-1}\sum_{i=0}^{L-1} |PO(xA + 1, yA + 1) - PREF(xA + 1 + vX, yA + j + vY)| \quad (11)$$

The value of (vX, vY) for which sumA (vX, vY) is a minimum in the range $-vLIMIT \leq vX \leq vLIMIT$, $-vLIMIT \leq vY \leq vLIMIT$ is set as the motion vector VA= (vAX, vAY) of the subblock A.

Similarly, sumB (vX, vY), sumC (vX, vY), sumD (vX, vY) are calculated and stored, together with sumA (vX, vY). The motion vectors of subblocks B, C and D are also obtained. Then, the differences between these vectors motion are calculated, from which the block patterns are determined using the rules set out in Table 1.

For instance, when the pattern PT2 is selected, $$sumA+B(vX, vY)=sumA(vX, vY)+sumB(vX, vY) \quad \ldots (12)$$

The value of (vX, vY) for which sumA+B is a minimum in the range of $-vLIMIT \leq vX \leq vLIMIT$, $-vLIMIT \leq vY \leq vLIMIT$ is set as the vector VA+B=(v(A+B)X, v(A+B)Y). The vector VC+D=(v(C+D)X, v(C+D)Y), which gives a maximum value of sumC+D (vX, vY)=sumC (vX, vY)+sumD (vX, vY), is calculated in a similar manner. The resulting vectors VA+B, VC+D are representative motion vectors.

In the case of the block pattern PT4, $$sumB+C+D(vX, vY)=sumB(vX, vY)+sumC(vX, vY)+sumD(vX, vY) \quad \ldots (13)$$

and the vector VB+C+D is calculated therefrom. The representative vectors are vectors VA and VB+C+D.

In the case of the block pattern PT1, $$sumA+B+C+D(vX, vY)=sumA(vX, vY)+sumB(vX, vY)+sumC(vX, vY)+sumD(vX, vY) \quad \ldots (14)$$

and the representative vector VA+B+C+D is calculated therefrom.

Note that the methods of selecting the block pattern and the representative vector are not limited to the embodiment discussed above. For example, another method of selecting the block pattern could involve selecting based on the magnitude of the absolute difference sum with respect to the prediction picture. Further, as a method of selecting the representative motion vector, in the case of, e.g., the block pattern PT2, the representative vectors are (vector VA+vector VB)/2 and (vector VC+vector VD)/2. In the case of the pattern PT4, the representative vectors may be the vector VA and (vector VB+vector VC+vector VD)/3.

Moreover, the block pattern codes are not limited to those set forth in Table 2. Besides, in the embodiment described above, the motion vectors of the four subblocks are expressed by the two representative motion vectors, but may alternatively be expressed by three representative motion vectors.

Figure 20:
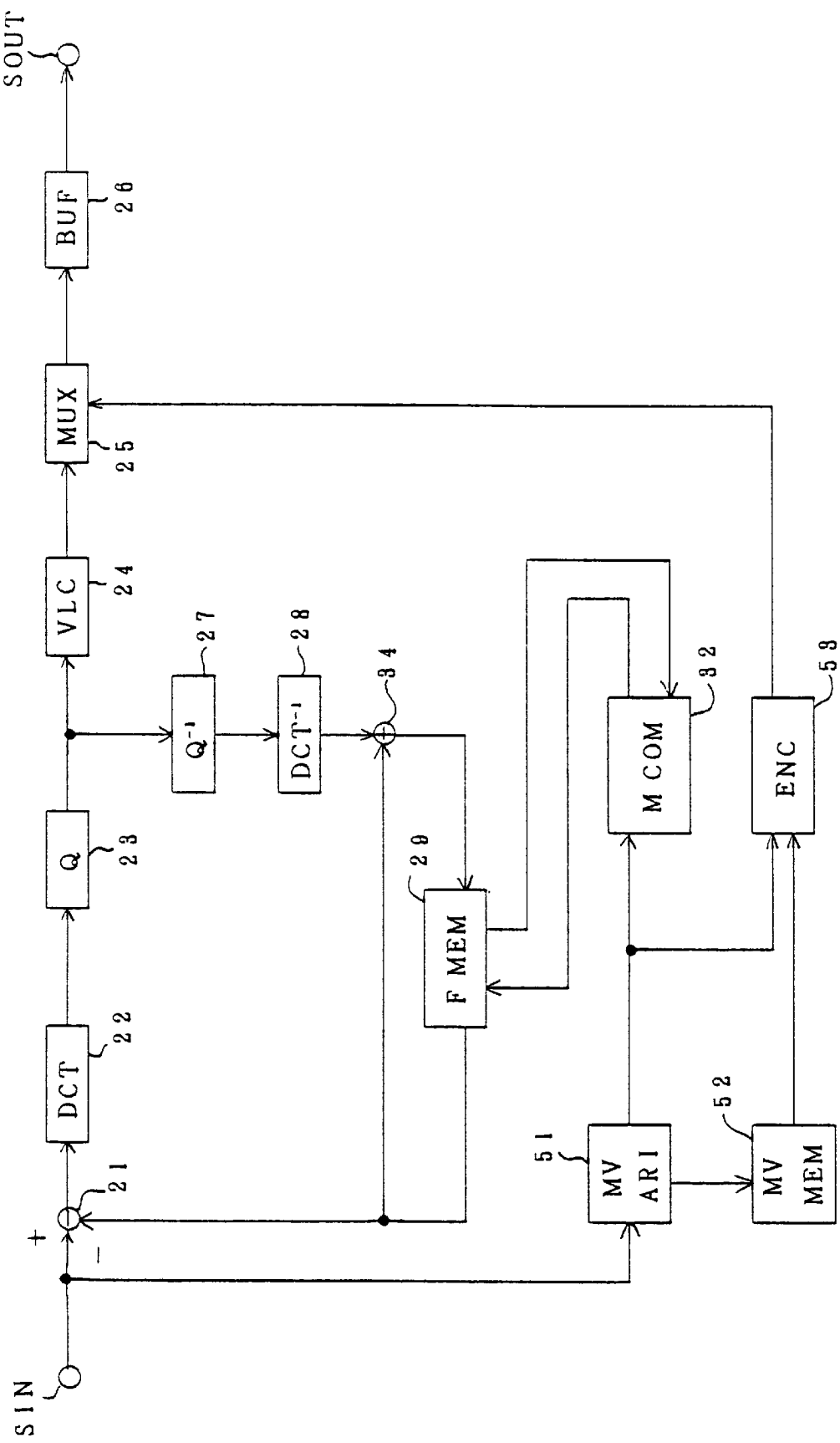
FIG. 20 is a block diagram illustrating the construction of third embodiment of an apparatus for compressing a picture signal according to the present invention.

FIG. 20 is a block diagram illustrating a third embodiment of an apparatus for compressing a motion picture signal. In FIG. 20, parts corresponding to those in the embodiment shown in FIG. 13 are designated by like reference numerals or characters. The motion picture signal, divided into blocks of, for instance, 8×8pixel values, is fed into the motion vector arithmetic unit 51. The output of the motion vector arithmetic unit 51 is fed into the motion vector memory 52 and stored therein. The output of the motion vector arithmetic unit 51 is also fed into the motion compensator 32, and into the vector encoder 53. The prediction picture read out data from the frame memory 29 is fed into the motion compensator 32. The output read from the motion vector memory 52 is also supplied to the vector encoder 53. The information received by the vector encoder has been processed by the arithmetic equations described above, so that differential vector information and block pattern information is encoded therein.

The coded transform coefficients coded by the variable length coder 24 are supplied to the multiplexer 25, which multiplexes them with the differential vector information and feeds the resulting multiplexed signal to the output buffer 26. The compressed motion picture signal is read out of the output buffer for recording on a disc (not shown), for instance.

Figure 21:
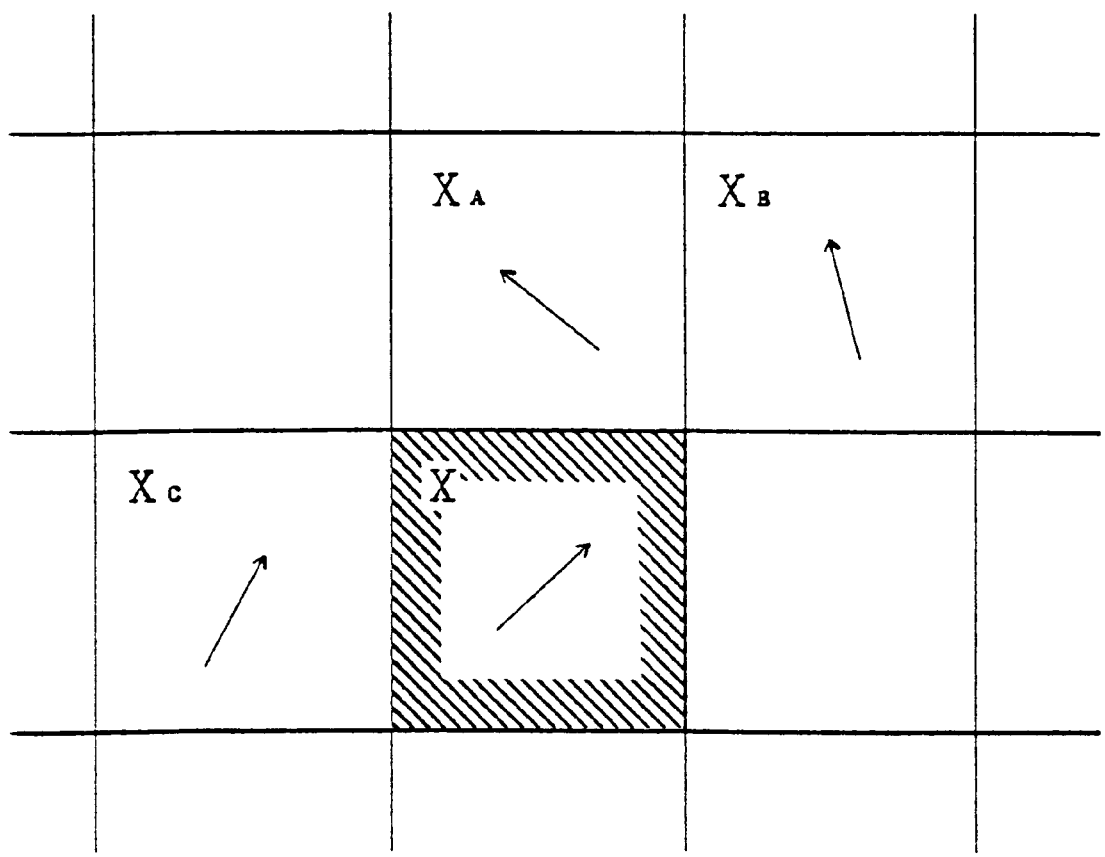
FIG. 21 is a schematic view for explaining the method used in the embodiment shown in FIG. 1 in which the present picture is segmented into blocks for carrying out motion compensation.

The operation of the circuit shown in FIG. 20 will be described with prediction to FIG. 21 through FIG. 24. FIG. 21 illustrates how the motion picture signal is segmented into blocks, each of which includes 8×8 pixel values, as the units for carrying out motion compensation. Shown in this example is the case in which the motion vectors of three neighboring blocks A, B, and C, adjacent upwards, right upwards and to the left of the current block X are to be compared.

Each block has one motion vector for indicating the motion with respect to a prediction block of a prediction picture, one picture before the current block X. More specifically, VX is temporarily defined as the motion vector of the current block X, while VA, VB, and VC are defined as the motion vectors of the neighboring blocks A, B, and C, respectively. Herein, when VX is coded using the fewest bits, processing based on the following algorithms is executed. Namely;

(1) A first step is to check which of the motion vectors VA or VB or VC equals VX (alternatively, whether or not differences fall within a range that is allowable as equal). If two or more vectors are equal to VX, they are represented by one vector; and (2) Next, if it is judged that any of the vectors VA, VB and VC does not equal VX (alternatively, whether the differences exceed the allowable range), the vector coded using the shortest length code among the four vectors, VX-VXA, VX-VXB, VX-VXC, VX is selected (simply, the vector having the least magnitude among the four vectors is selected).

Figures 22, 23:
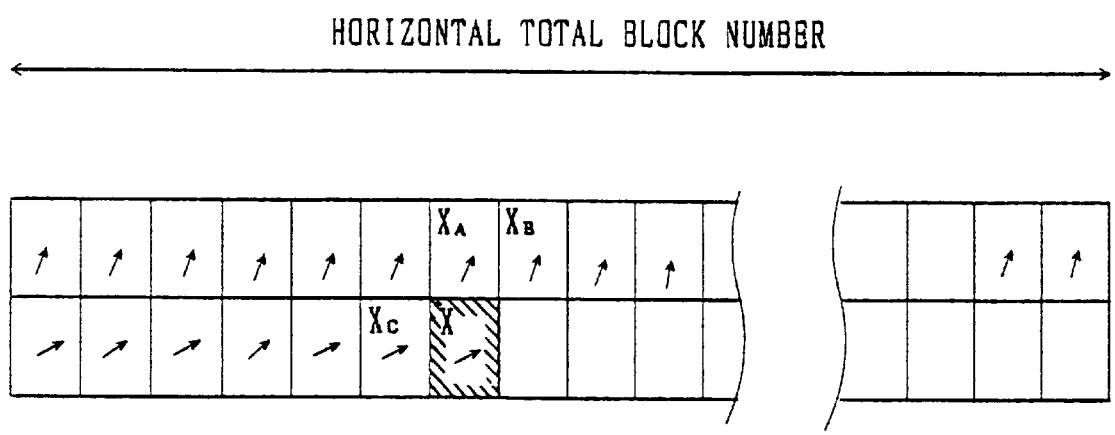
FIG. 22 is a table for explaining the differential vector, and the adoption block code used in the embodiment shown in FIG. 1.
FIG. 23 is a schematic view for explaining the construction of the motion vector memory 52 used in the embodiment shown in FIG. 1.

There exist three possible results from the processing of step (1), and four possible results from the processing in step (2), a total of seven possible results from the processing. These results are, as illustrated in FIG. 22, expressed by 3-bit adoption block codes.

In the case of step (1), if it is determined that one of the vectors, VA, VB, and VC is equal to the motion vector VX (alternatively, the difference falls within the range that is allowable as equal). In the case of step (2), if it is decided that none of the vectors, VA, VB, and VC is equal the motion vector VX (alternatively, the differences exceed the allowable range), transmitted also are the differential vector having the shortest code length among four vectors, VX-VXA, VX-VXB, VX-VXC and VX and the adoption block code after being coded.

Note that, if the current block X is located in the outermost row or column of the picture, as can be seen from FIG. 21, the blocks XA and XB of will not exist (when the current block is located in the uppermost row), or the block XC will not exist (when the current block is in the leftmost column). In such cases, no current block X is disposed in the first row and column of the picture, the comparative neighboring blocks do not exist at all. In such cases, the motion vector VX of the current block X is included in the compressed picture signal as it is.

In the motion vector arithmetic unit, the motion vector is computed from the current block of the motion picture signal. The motion vector memory 52 is capable of storing, as shown in FIG. 23, twice as many motion vectors as the number of blocks in each row of the picture, i.e., the motion vectors for two rows. The motion vector memory 52 holds the vectors of the row that is now being processed, i.e., the current row, and the row before it. The adoption block code and the vector value (or differential value) are coded for each block, and the coded result is transferred from the vector encoder 53 to the multiplexer 25.

Further, the variable-length coder (VLC) 24 described above codes the quantized transform coefficients using the VLC codes shown in FIG. 24, which are then fed into the above-mentioned multiplexer 25. The codes from the vector encoder 53 are multiplexed therein and transmitted via the output buffer 26 to a transmission path or a medium such as a storage device or the like (not shown).

Figure 25:
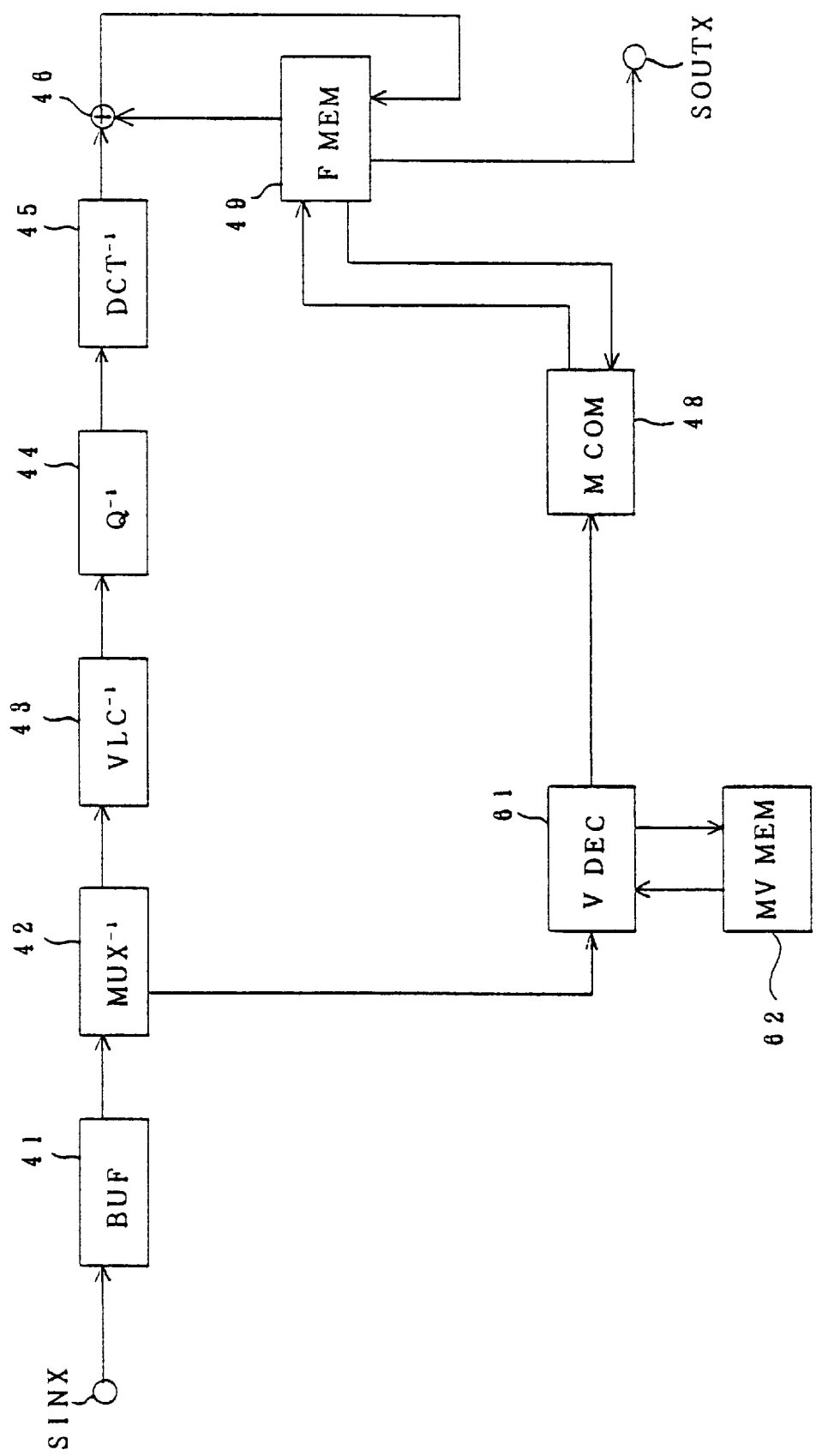
FIG. 25 is a block diagram illustrating the construction of one embodiment of an apparatus for expanding a compressed picture signal compressed by the apparatus shown in FIG. 18 for compressing a picture signal.

FIG. 25 is a block diagram demonstrating one embodiment of an apparatus for expanding a compressed motion picture signal compressed by the compressor shown in FIG. 18. In FIG. 25 parts corresponding to ones of FIG. 18 are designated by same reference numbers or characters. The compressed motion picture signal is supplied to the demultiplexer 42 via the input buffer 41. The demultiplexer separates from the compressed motion picture signal the coded transform coefficients and the differential vector information (i.e., the adoption block code and the differential vector code).

The differential vector information separated by the demultiplexer 42 is supplied to the vector decoder 61, to which the motion vector memory 62 is connected, to decode the motion vector VX of the current block according to the adoption block code. The output of the vector decoder is supplied to the motion compensator 48, to which the output of the frame memory 49 is connected. The motion compensator performs motion compensation using the motion vector, and stores the result in the frame memory 49 as a prediction block. The prediction block is supplied to the adder 46, where it is added to the block of reconstructed prediction errors from the inverse discrete cosine transform circuit 45, to provide a block of the reconstructed picture.

The output of the adder 46 is supplied to the frame memory 49, where it is stored, and is read out as a block of the reconstructed picture signal.

Figure 26:
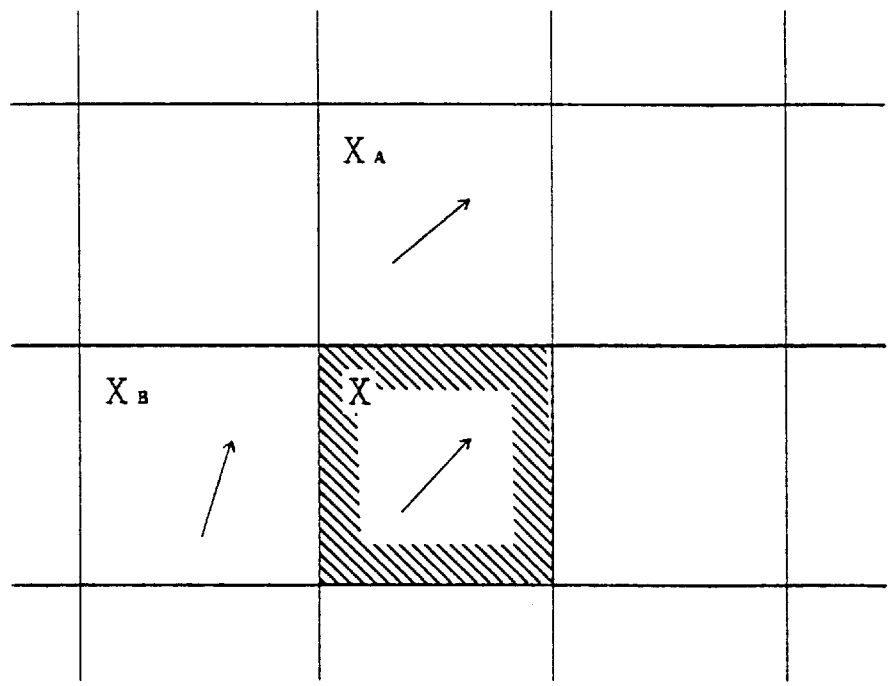
FIG. 26 is a schematic view for explaining another embodiment in which the present picture is segmented into blocks for carrying out motion compensation.
Figure 27:
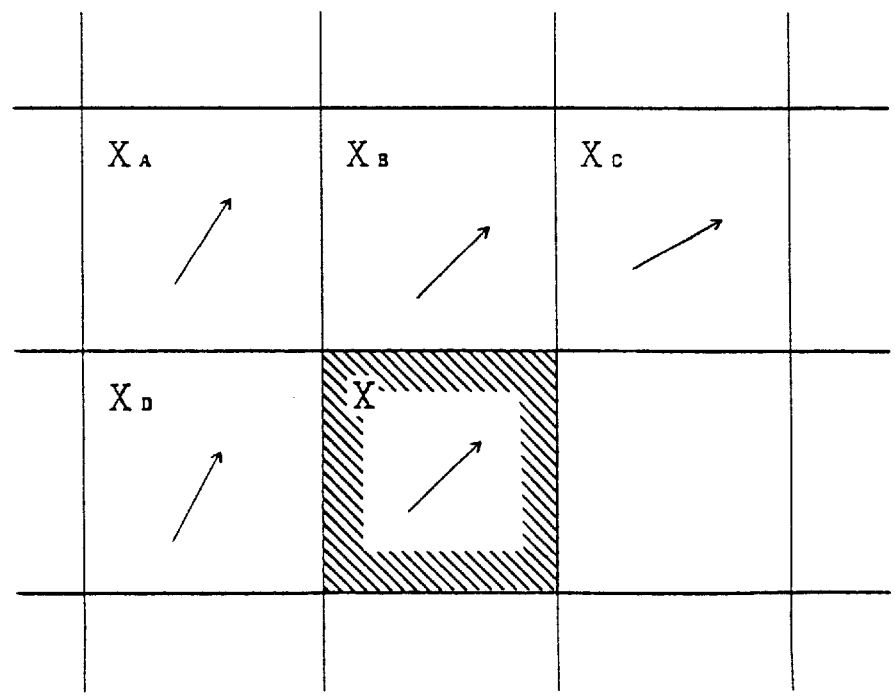
FIG. 27 is a schematic view for explaining a further embodiment in which the present picture is segmented into blocks for carrying out motion compensation.

In the above mentioned compressor, the three neighboring blocks, such as XA, XB, and XC, are compared with the current block X. The current block may alternatively be compared with two neighboring blocks, such as XA and XB, as shown in FIG. 26, or with four neighboring blocks, such as XA, XB, XC, and XD, as shown in FIG. 27.

In the embodiment illustrated in FIG. 22, the adoption block code need not be a fixed length code of three bits, but also may be a variable-length code. Although the magnitude of the vectors is variable-length coded in the manner shown in FIG. 24, the present invention is not limited this.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. Apparatus for compressing a motion picture signal, the motion picture signal including a current picture which is divided into blocks including a target block and a plurality of comparison blocks, the apparatus comprising:

motion detecting means for calculating, from prediction blocks of a prediction picture and each block of the current picture, a motion vector for each block of the current picture;

difference determining means for determining a difference between each prediction block of the prediction picture to provide a prediction error block;

orthogonal transform means for orthogonally transforming the prediction error block to provide transform coefficients;

quantizing means for quantizing the transform coefficients to provide quantized transform coefficients;

local decoding means for locally decoding the quantized transform coefficients to provide a block of an additional prediction picture;

motion vector encoding means, operating when respective differences between the motion vector for the target block and each motion vector for the comparison blocks is outside an allowable range, for generating an encoding of the motion vector for the target block which represents the motion vector for the target block as a difference between the motion vector for the target block and the motion vector for a selected one of the comparison blocks; and motion compensating means for producing the blocks of the prediction picture, the motion compensating means producing each prediction block of the prediction picture by applying motion compensation to the prediction picture in response to the motion vectors calculated by the motion detecting means.

2. The motion picture signal compressing apparatus according to claim 1, further comprising:

coding means for coding the quantized transform coefficients to provide coded quantized transform coefficients; and multiplexing means for multiplexing the coded quantized transform coefficients and the encoding of the motion vector for the target block to generate a multiplexed encoded picture signal.

3. The motion picture signal compressing apparatus according to claim 1, wherein said local decoding means includes:

inverse quantizing means for inverse quantizing the quantized transform coefficients to generated inverse quantized data; and inverse orthogonal transformation means for inverse orthogonally transforming the inverse quantized data to provide the additional prediction picture.

4. The motion picture signal compressing apparatus according to claim 1 wherein said comparison blocks consist of blocks of the current picture that are directly adjacent the target block on predetermined sides of the target block.

5. The motion picture signal compressing apparatus according to claim 4 wherein, when the target block is located at an outermost position of the current picture such that there are no blocks directly adjacent the target block on the predetermined sides of the target block, the motion vector encoding means provides the motion vector for the target block as the encoding of the motion vector for the target block.

6. The motion picture signal compressing apparatus of claim 1, wherein the encoding of the motion vector for the target block includes an indication of the selected one of the comparison blocks.

7. The motion picture signal compressing apparatus of claim 6, wherein the indication of the selected one of the comparison blocks indicates a position in the current picture of the selected one of the comparison blocks relative to a position in the current picture of the target block.

8. The motion picture signal compressing apparatus of claim 1 wherein the motion vector encoding means includes means, when a difference between the motion vector for the target block and a motion vector for one of the comparison blocks is within the allowable range, for generating an encoding of the motion vector for the target block which represents the motion vector for the target block as an indication of the selected one of the comparison blocks.

9. The motion picture signal compressing apparatus of claim 8, wherein the indication of the one of the comparison blocks includes an indication of a position in the current picture of the one of the comparison blocks relative to the target block.

10. The motion picture signal compressing apparatus of claim 1, wherein the motion vector encoding means includes:

means for selecting, as the selected one of the comparison blocks, a one of the comparison blocks for which the difference between the motion vector for the one of the comparison blocks and the motion vector for the target block can be represented in an adoption block code length which is less than an adoption block code length in which the difference between the motion vector for any comparison block, other than the selected one of the comparison blocks, and the motion vector for the target block can be represented.

11. The motion picture signal compressing apparatus of claim 10 wherein the motion vector encoding means includes means, when the motion vector for the target block can be represented in a shorter adoption code length than can the difference between the motion vector for the selected one of the comparison blocks and the motion vector for the target block, for generating an encoding of the motion vector for the target block which represents the motion vector for the target block merely by the motion vector for the target block.

12. An apparatus for expanding a compressed motion picture signal including a compressed picture block obtained by compressing a target block of a picture of a motion picture signal, the compressed picture block including coded transform coefficients and a motion vector encoding which represents a motion vector for the target block as a difference between the motion vector for the target block and a motion vector for a selected one of comparison blocks, the comparison block including blocks of the picture other than the target block and the motion vector encoding including an indication of which one of comparison blocks is the selected one of the comparison blocks, the apparatus providing an output signal, and comprising:

inverse multiplexing means for separating coded transform coefficients and the motion vector encoding from the compressed picture block;

motion vector decoding means for decoding the motion vector encoding for the target block to determine the motion vector for the target block; and p1 target block deriving means for deriving the target block of the output picture signal from the coded transform coefficients and the motion vector.

13. The apparatus according to claim 12, and further comprising:

decoding means for deriving a prediction error block from the coded transform coefficients, and wherein the target block deriving means includes motion compensating means for applying motion compensation to a prediction picture to provide a prediction block by applying motion compensation to the prediction picture in response to the motion vector determined by the motion vector decoding means; and means for producing the target block of the output picture signal by summing the prediction block and the prediction error block.

14. The apparatus according to claim 13, wherein said decoding means includes:

inverse variable length coding means for applying inverse variable length coding to the coded transform coefficients to provide quantized transform coefficients;

inverse quantizing means for inverse quantizing the quantized transform coefficients to provide transform coefficients; and inverse orthogonal transforming means for inversely orthogonally transforming the transform coefficients to provide the prediction error block.

\* \* \* \* \*

UNITED STATES PATENT AND TRADEMARK OFFICE
CERTIFICATE OF CORRECTION

PATENT NO.: 6,064,435
DATED: May 16, 2000
INVENTOR(S): RYUICHI IWAMURA

It is certified that an error appears in the above-identified patent and that said Letters Patent is hereby corrected as shown below:

In Col. 17, line 15, please delete "p1".

Signed and Sealed this

Twenty-fourth Day of April, 2001

Attest:

NICHOLAS P. GODICI

*Attesting Officer*　　*Acting Director of the United States Patent and Trademark Office*